United States Patent
Avena et al.

[15] 3,668,940
[45] June 13, 1972

[54] ROTATION TRANSMISSION MECHANISM

[72] Inventors: Salvatore Avena, Newark; Harry L. Richardson, River Edge, both of N.J.

[73] Assignee: Curtiss-Wright Corporation

[22] Filed: July 9, 1970

[21] Appl. No.: 53,436

[52] U.S. Cl. ...................................74/89.15, 74/57, 74/424.8
[51] Int. Cl. ........................................................F16h 27/02
[58] Field of Search..............74/56, 57, 58, 59, 89.15, 424.8

[56] References Cited

UNITED STATES PATENTS

| | | | |
|---|---|---|---|
| 2,347,364 | 4/1944 | Plumbo.....................................74/57 |
| 2,441,168 | 5/1948 | Richardson..............................74/57 |
| 2,502,761 | 4/1950 | Stachowiak et al......................74/57 |
| 2,883,183 | 4/1959 | Finsterwalder et al. ................74/56 |
| 2,834,216 | 5/1958 | Thompson............................74/89.15 |
| 3,068,709 | 12/1962 | Petersen..................................74/57 |
| 3,270,360 | 9/1966 | Kropp.......................................74/57 |

*Primary Examiner*—William F. O'Dea
*Assistant Examiner*—Wesley S. Ratliff, Jr.
*Attorney*—Arthur Frederick and Victor D. Behn

[57] ABSTRACT

The rotation transmission mechanism has an input member connected to a source of rotary power and an output member connected to an element to be actuated. A cam supported for both rectilinear and angular movement is disposed to interconnect the input and output members, which cam coacts with a cam follower on the housing of the mechanism to effect transmission of torque from the input member to the output member and, at predetermined periods, permitting only rectilinear movement of the cam thereby preventing transmission of rotation between the input and output members.

12 Claims, 8 Drawing Figures

INVENTORS
Salvatore Avena
Harry L. Richardson

ATTORNEY

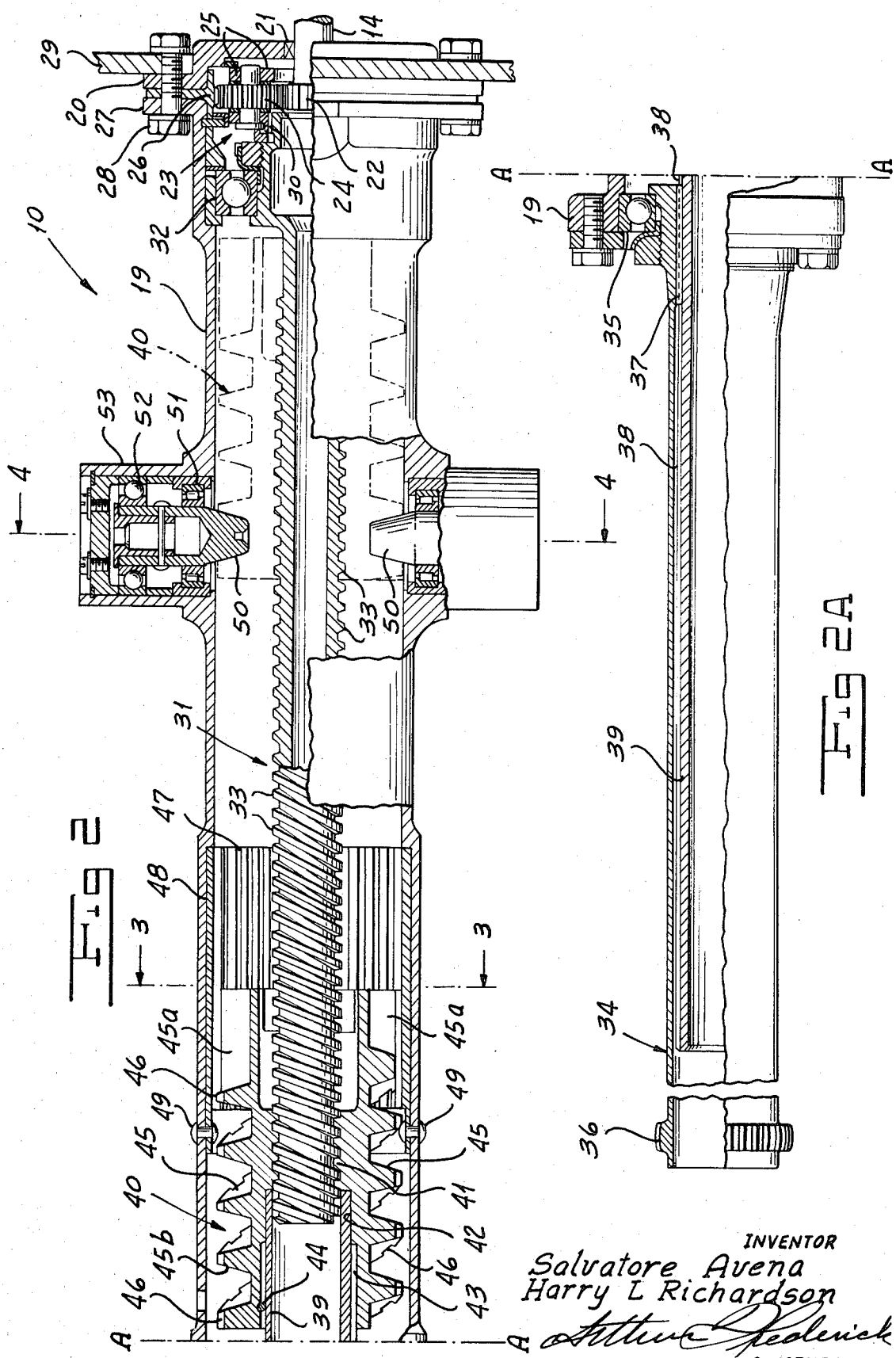

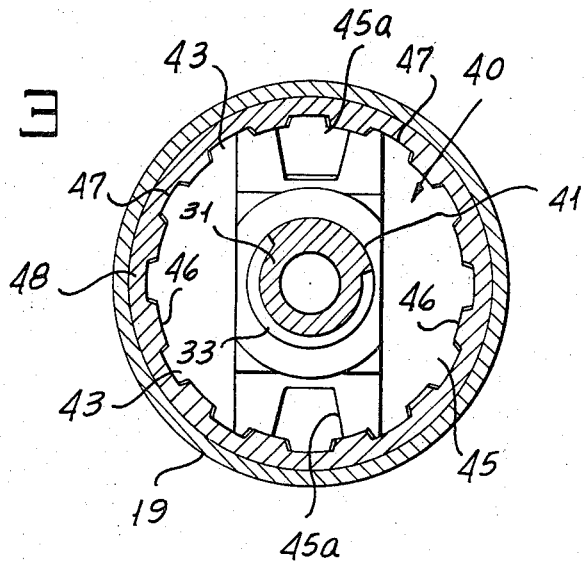
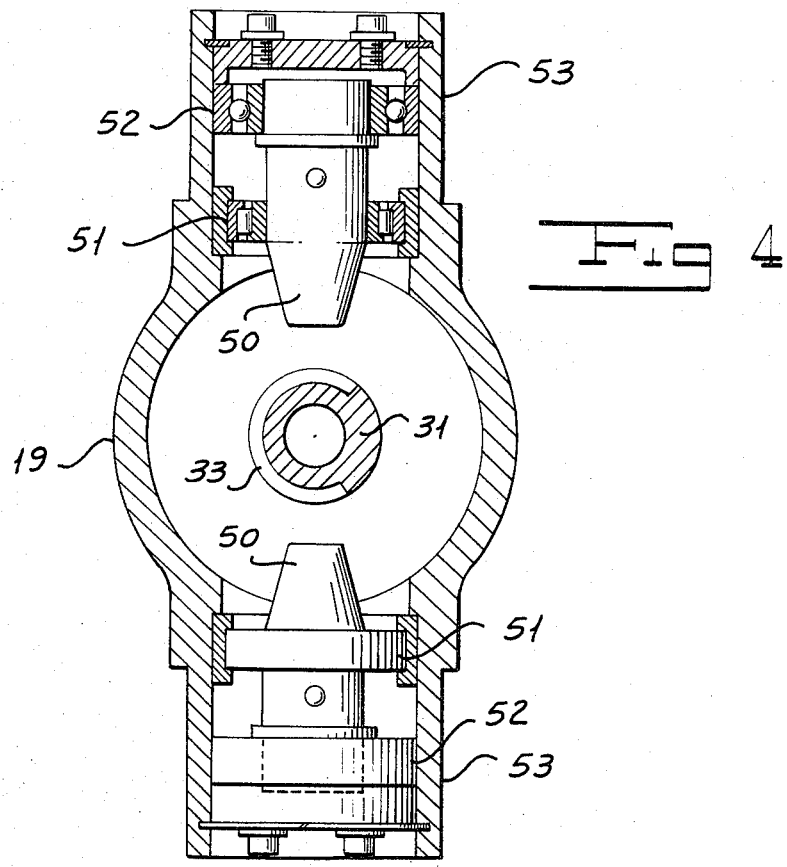

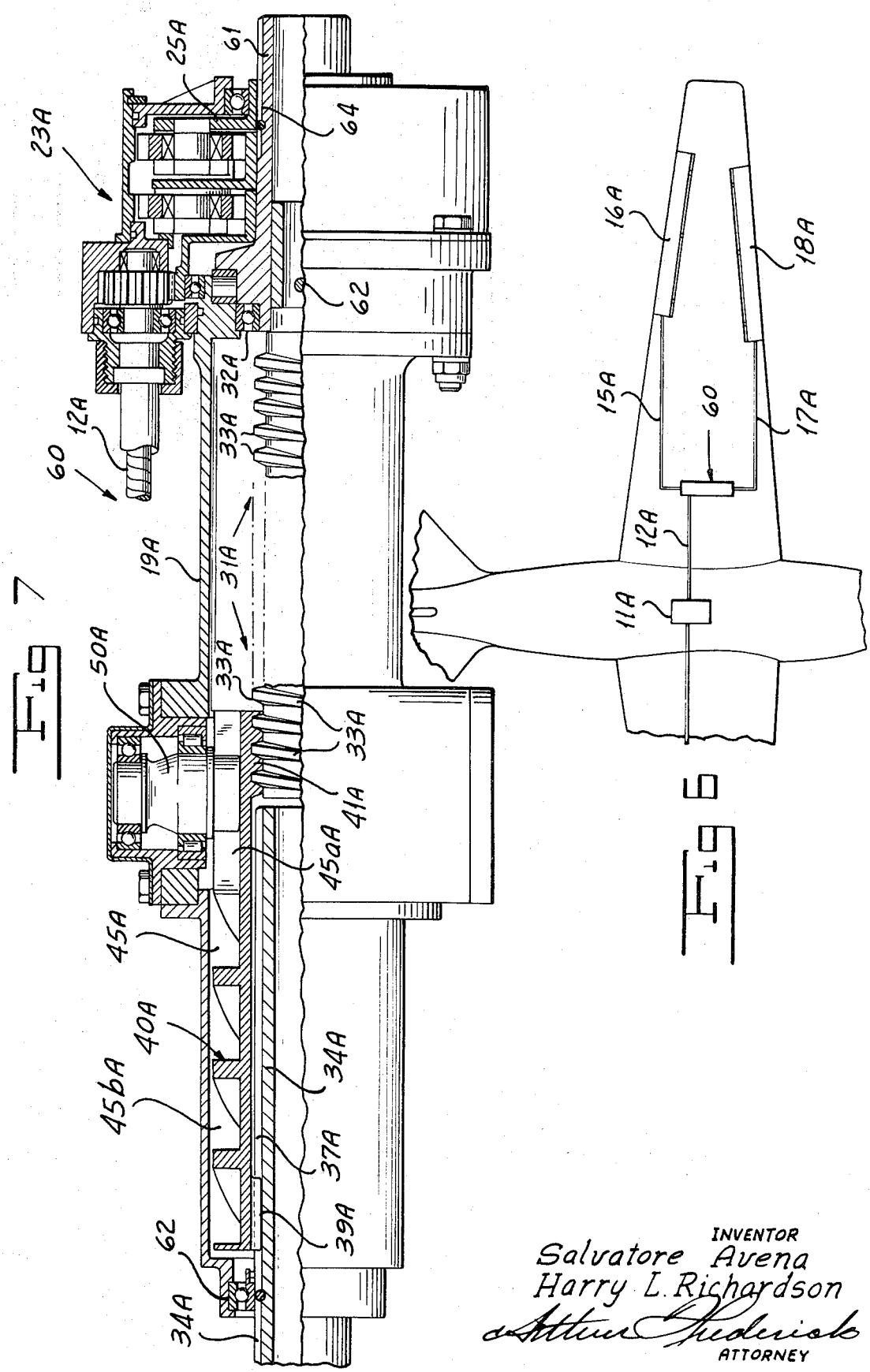

ROTATION TRANSMISSION MECHANISM

This invention relates to rotation transmission mechanisms and, more particularly, to rotation transmission mechanisms in which rotary motion is delayed or interrupted for specified periods, hereinafter referred to as "sequential rotation transmission mechanisms."

In modern aircraft, the leading edge of the wings are provided with movable surfaces or "slats" in addition to adjustable trailing edge surfaces called "flaps." The slats and flaps in the operation of the aircraft, must be actuated in proper sequence. In view of the complexity and speed of modern aircraft, it is desirable that the burden of actuating the slats and flaps in proper sequence be removed from the aircraft crew members. Heretofore, separate rotary power systems were provided for manipulation of the slats and flaps, which systems employed relatively complex clutch-brake and timing mechanisms. In addition to the complexity of such systems, they have the disadvantages of being excessively bulky and heavy. Also, they failed to maintain indexing accuracy. Accordingly, any suitable rotation transmission mechanism for the actuation of aircraft wing slats and flaps must be light in weight and structurally compact to fit within the limited space within the wing as well as the structural strength to be capable of transmitting high torque loads. Furthermore, such mechanisms have to be capable of maintaining a preload torque on the actuated elements when in a closed position as well as being capable of reacting to this static output load of one of the members to be actuated while the other member is being actuated. Another important requirement of slat and flap actuating mechanisms is that it must be able to maintain proper relative movement of the slats and flaps during all phases of operation.

Accordingly, it is an object of this invention to provide a sequential rotation transmission mechanism which is relatively light in weight, compact in size, and capable of transmitting high torque loads as well as imposing relatively high preloaded torques.

Another object of the present invention is to provide a sequential rotation transmission mechanism which transmits torque from a single source of rotary power to a member to be actuated at intervals relative to torque transmitted to another member to be actuated.

A further object of this invention is to provide a sequential rotation transmission mechanism capable of repeated operations without loss of synchronization of components and proper sequential operation of the members to be actuated.

A feature of the present invention is the direct mechanical interconnection which is maintained between the rotary input and the rotary output elements during both angular and rectilinear movement of the components of the sequential rotation transmission mechanism.

Another feature of this invention is the cam which coacts with a rotary input means, housing, and a cam follower means to move both rectilinearly and angularly with the transfer of torque load between the housing and the cam follower means achieved without imposition of impact stresses on the housing, cam, and cam follower means.

SUMMARY OF THE INVENTION

It is therefore contemplated by the present invention to provide a novel sequential rotation transmission mechanism comprising an input member supported for rotation in a housing and connected to a source of rotary power to be rotated by the latter and an output member supported for rotation in the housing and connected to effect rotative movement of elements to be actuated. A cam means is supported for rectilinear and rotative movement in the housing and is connected to the input member to receive torque loads from the latter. A means connected to the housing coacts with the cam to react to all of the output torque loads so that when the cam only moves rectilinearly, no rotation is imparted to the output member. At a preselected period or periods the cam is permitted to rotate, as well as translate, to provide a driving torque which effects angular movement to the output member and, in turn, the elements to be actuated.

In one embodiment of the invention the cam means is restrained entirely against angular movement by engagement with spline means associated with the housing. The cam means is also provided with camming surfaces which are engaged, when the cam is out of engagement with the spline means, by cam follower means associated with the housing to allow rotative movement of the cam during rectilinear movement, and thereby effect transmission of torque to the output member.

In an alternative embodiment of this invention, the sequential rotation transmission mechanism is provided with a second output member which is rotatively driven from the source of rotary power. Also in this embodiment the cam means and cam follower means are constructed and arranged to coact to fully restrain the cam means against rotation and, at preselected periods, allow rotation with axial, translative movement to thus transmit rotation to the first output member.

DESCRIPTION OF THE DRAWING

The invention will be more fully understood from the following description thereof when considered in connection with the accompanying drawing wherein two embodiments of the invention are illustrated by way of example an in which:

FIG. 2 is a longitudinal cross-sectional view with parts in elevation of one portion of the sequential rotation transmission mechanism shown schematically in FIG. 1;

FIG. 2A is a partial, longitudinal cross-sectional view of the output end portion of the sequential rotation transmission mechanism shown in FIG. 2 and joined to FIG. 2 on line A—A;

FIG. 3 is a transverse sectional view taken along line 3—3 of FIG. 2; FIG. 4 is a transverse sectional view taken along line 4—4 of FIG. 2, on a somewhat enlarged scale;

FIG. 6 is a diagramatic view, similar to FIG. 1, showing a sequential rotation transmission mechanism according to another embodiment of this invention applied to the actuation of wing slats and flaps; and FIG. 7 is a partial, longitudinal cross-sectional view of the mechanism schematically shown in FIG. 6.

DESCRIPTION OF PREFERRED EMBODIMENTS

Figure 1:
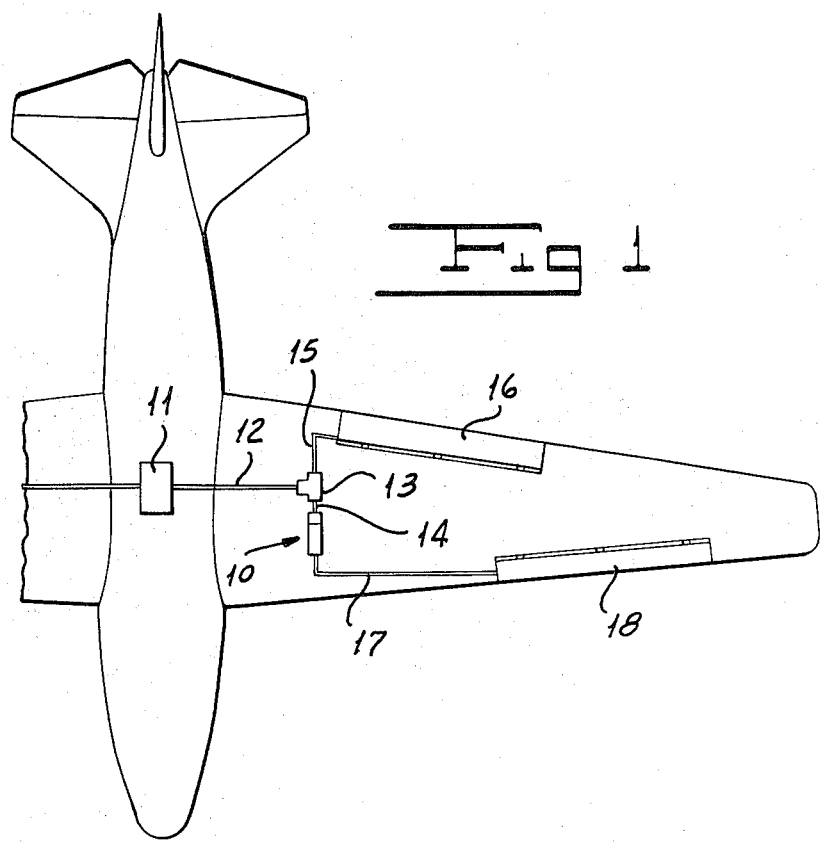
FIG. 1 is a schematic drawing of an aircraft in which a sequential rotation transmission mechanism according to this invention is employed to actuate wing slats and flaps.

Now referring to the drawings and more particularly to FIGS. 1 to 5, the reference numeral 10 generally designates a sequential rotation transmission mechanism according to a first embodiment of this invention. While mechanism 10 is shown in FIG. 1 as used for the actuation of slats and flaps of aircraft wings, it is to be understood that the invention is not limited to such application and may be employed for the actuation of a broad range of elements in aircraft and in other vehicles and devices without departure from the scope and spirit of this invention.

As shown in FIG. 1, mechanism 10 is connected to a motor means 11, such as an electric or fluid motor or some other suitable source of rotational power, through a drive shaft 12 and a gear assembly 13. The gear assembly 13 is connected by a secondary drive shaft 14 to mechanism 10 and, through suitable torque tubes 15 and gears (not shown), or other drive means, to flap 16. The mechanism 10 is connected, via torque tubes 17 and gears (not shown), or other suitable drive means, to slats 18 in the leading edge of the wing.

In operation of the assembly shown in FIG. 1, drive shaft 12 is rotationally driven by motor means 11 and, in turn, simultaneously rotates drive shaft 14 and torque tubes 15 through assembly 13. The rotation of torque tubes 15 and gears (not shown), effects movement of flap 16. If delay in the actuation of slat 18 is desired, mechanism 10, as will be fully described herein, will not transmit rotation to torque tubes 17 and gears (not shown), until a predetermined angular motion of drive shaft 12 has elapsed from the commencement of actuation of flap 16.

As best shown in FIGS. 2 and 2A, mechanism 10 comprises an elongated casing or housing 19 which is open at one end and closed at the opposite end by an end plate 20. End plate 20 has an opening in which is mounted a bearing 21 for supporting one end of drive shaft 14. A sun gear 22, forming part of a compound planetary reduction gear assembly 23, is secured to the end of drive shaft 14 for conjoined rotation with the latter. The planetary gear assembly 23 includes a plurality of circumferentially spaced planet pinions 24 (only one of which is shown in FIG. 2) supported by a carrier or cage 25 in meshing relationships with sun gear 23 and a concentric internal ring gear 26. The ring gear 26 is clamped between the flanged end portion 27 of housing 19 and end plate 20 by mounting bolts 28 which also serve to connect mechanism 10 to a support structure 29. The cage 25 of planetary gear assembly 23 is spline connected at 30 to an input shaft 31 to effect rotation of the latter. The input shaft 31 is an elongated tubular member journalled at one end in a bearing 32 to extend coaxially within housing 19. A thread 33 which may be of the acme type is formed on the external surface of input shaft 31.

As shown in FIG. 2A, a tubular output shaft 34 is journalled at one end in a bearing 35 mounted in the open end of housing 19 so as to extend from the housing coaxially with respect to the housing and input shaft 31. The output shaft 34 is of sufficient length to accommodate the full linear stroke of tubular extension member 39 so that the output shaft and extension member 39 always remain in engagement for the transmission of rotation as will be more fully understood hereinafter. The distal end portion of output shaft 34 is provided with a gear 36 which is constructed and arranged to engage torque tubes 17 (see FIG. 1) to effect rotation of the latter. Adjacent bearing 35 output shaft 34 is provided with internal splines 37 which mesh with splines 38 found on the outer surface of a tubular extension member 39 disposed coaxially within output shaft 34. The tubular extension member 39 forms part of a cam 40 which functions to interconnect input shaft 31 with output shaft 34 and support input shaft 31 as will be more fully explained hereinafter (see FIGS. 2 and 5).

Figure 5:
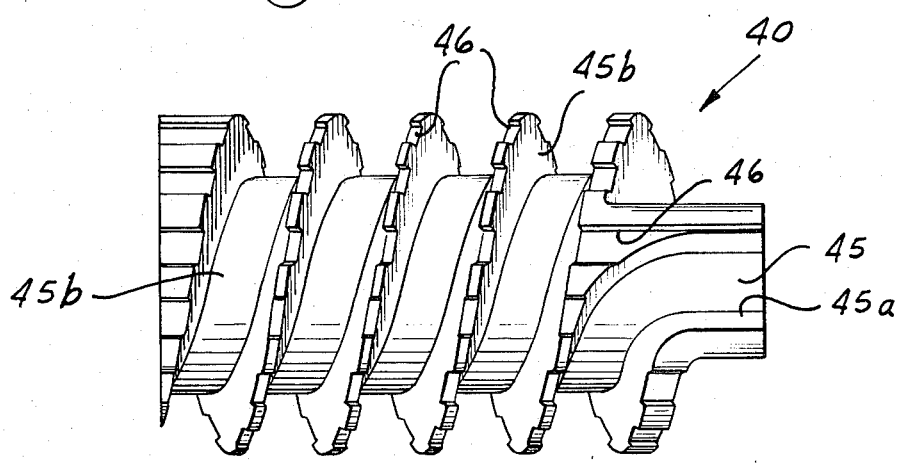
FIG. 5 is an elevational view of the cam element which is a component of the mechanism shown in FIGS. 2 and 2A.

As best illustrated in FIGS. 2, 3 and 5, cam 40 comprises a cylindrical element which has an axial bore which is threaded at 41 to mesh with threads 33 of input shaft 31. The bore of cam 40 is counterbored at 42 to receive one end of extension member 39 and is rotatively connected to the latter by internal splines 43 which mesh with splines 38 of extension member 39. The cam and extension member 39 are secured together as a unitary structure by a lock wire 44. The outer surface of cam 40 is provided with two relatively deep camming grooves 45 each of which consists of a straight portion 45a extending parallel to the longitudinal axis of the cam and a helical portion 45b. The peripheral surface of cam 40 is also provided with longitudinally extending, relatively shallow, splines 46 which, in one operative position, meshes with internal splines 47 formed in a sleeve 48. The sleeve 48 is secured within housing 19 by fastening members, such as rivets 49. Obviously, sleeve 48 may be omitted and splines 47 may be formed on the internal surface of housing 19 without departure from the scope and spirit of this invention. The meshing relationship of splines 46 and 47 prevents rotation of cam 40 under the urging of or torque force imposed on the cam by input shaft 31 when the latter rotates. With the splines 46 and 47 in mesh and input shaft 31 rotating counterclockwise, cam 40 will move axially in a direction to the right, as viewed in FIG. 2, under the urging of the coaction of the meshing threads 33 and 41 of input shaft 31 and cam 40, respectively. This translatory movement of cam 40 continues until splines 46 of the cam are free of splines 47 of sleeve 48 and cam follower rollers 50 engage the helical portion 45b of grooves 45.

As best shown in FIGS. 2 and 4, each of the cam follower rollers 50 is supported by bearings 51 and 52 in radial housing extensions 53 so as to project inwardly of the inner surface of housing 19 and into the translatory path of cam 40. The cam follower rollers 50 are arranged diametrically opposite each other and in alignment or register with the camming grooves 45. Each of the rollers is tapered at an angle complementary to the taper of the side walls of camming grooves 45. The cam 40 is dimensioned in relation to the position of rollers 50 so that the rollers 50 are fully in engagement with camming grooves 45 before splines 46 of the cam disengage from splines 47 of sleeve 48. This construction insures the transfer of the torque load from splines 47 to the rollers 50 smoothly and without impact stresses imposed on the cam and rollers. After engagement of rollers 50 with camming grooves 45, cam 40 continues to translate because it is held against rotation by the engagement of rollers 50 in the straight portions 45a of camming grooves 45. When the rollers 50 enter the helical portions 45b of camming grooves 45, part of the torque force exerted on cam 40 by input shaft 31 is released to cause rotation of cam 45 simultaneously with its rectilinear movement. The rotative movement of cam 40 effects rotation of tubular extension member 39 which, in turn, rotates output shaft 34, through the engagement of splines 38 of extension member 39 and splines 37 of output shaft 34.

In the operation of mechanism 10, as herein described and as shown in FIG. 1, rotation of drive shaft 12, when driven by motor means 11, effects rotation of torque tubes 15 and gears (not shown) through gear assembly 13. The torque tube 15 and gears (not shown), in turn, effect actuation of flap 16. Simultaneously with actuation of flap 16, gear assembly 13 rotatively drives secondary drive shaft 14. As shown in FIG. 2, secondary drive shaft 14 effects rotation of input shaft 31, through a compound planetary gear assembly 23. Manifestly, planetary gear assembly 23 may be omitted and secondary drive shaft 14 directly connected to input shaft 31 or in some other suitable manner connected to rotate input shaft 31 without departing from the scope and spirit of this invention. The rotation of input shaft 31 imparts a torque force to cam 40 through the meshing teeth of threads 33 and 41, but cam 40 is prevented from rotating by the meshing splines 46 and 47. Since cam 40 is restrained against rotation, the torque force is resolved into an axially directed force which causes cam 40 to move rectilinearly to the right as viewed in FIG. 2. The cam 40 translates to the right with cam follower rollers 50 entering camming grooves 45 and, after full engagement of the rollers in the groove, disengagement of splines 46 from splines 47. The cam continues to be restrained from rotation by the coaction of rollers 50 and straight portions 45a of camming grooves 45. Thus, the cam continues to move only axially and therefore no rotation is imparted by cam 40 and its tubular extension 39 to output shaft 34. With output shaft rotatively stationary, no rotation is imparted to torque tubes 17 and gears (not shown) and, hence, slats 18 are not actuated. When rollers 50 enter helical portions 45b of camming grooves 45, part of the torque force exerted on cam 40 by input shaft 31 is released and cam 40 rotates as it continues to move axially to the right as viewed in FIG. 2. The rotative movement of cam 40 is transmitted from tubular extension 39, to output shaft 34. The tubular extension 39 is in constant connection with output shaft 34 during its rectilinear movement, through the meshing splines 37 and 38 (see FIG. 2A), so that the moment cam 40 begins to rotate, output shaft 34 begins to rotate. The output shaft 34 may be rotated until cam 40 reaches the extreme position shown in broken lines in FIG. 2, at which time, slat 18 is in its maximum open position.

When flaps 16 and slats 18 are to be closed, motor means 11 rotates drive shaft 12 in the opposite direction so that secondary drive shaft 14 and torque tube 15 and gears (not shown) are rotated in the opposite direction via gear assembly 13. Reverse rotation of secondary drive shaft 14 effects reverse rotation of input drive shaft 31 of mechanism 10. The reverse rotation of input drive shaft 31 causes cam 40 to rotate in the opposite or reverse direction and simultaneously axially move to the left as viewed in FIG. 2. The reverse rotation of cam 40 is transmitted to output shaft 34, via tubular extension 39, and slat 18 is moved toward a closed position through reverse rotation of torque tubes 17 and gears (not shown). The slat 18 and flap 16 are simultaneously moved toward a closed position, but with slat 18 reaching the closed or "home" position before flap 16. Substantially, simultaneously with slat 18 reaching its closed position, cam follower rollers 50 enter the straight portions 45a of camming grooves 45 and cam 40 is held against rotation so that output shaft 34 ceases to rotate. At this time, the output shaft 14, through torque tubes 17 and gears (not shown) exerts a predetermined preload force on slat 18 to prevent inadvertent opening of the slat under external air pressures, vibrational forces, or the like. As input shaft 31 continues to rotate and flap 16 continues to move toward a closed position, cam 40 continues to move toward the left as viewed in FIG. 2 so that rollers 50 leave camming grooves 45 shortly after splines 46 and 47 come into meshing relationship again. Thus, smooth transfer of torque load is transferred from the rollers to the splines 46 and 47. Finally, when cam 40 reaches the full line position shown in FIG. 2, flat 16 is in the closed or "home" position with a predetermined preload exerted on the flap.

While mechanism 10 has been shown and described as functioning to delay transmission of rotation, relative to the rotation of another element, it is obvious that camming grooves 45 of cam 40 may be modified to effect an interruption of rotation for a predetermined interval of time or cease transmission of rotation at a preselected time before rotation of another element terminates. By various combinations of straight portions 45a and helical portions 45b, various rotational transmission effects can be achieved to meet the special requirements of a particular application of mechanism 10.

In FIGS. 6 and 7 is shown a second embodiment of the present invention which sequential rotary transmission mechanism 60 differs from mechanism 10 shown in FIGS. 1 to 5 in that it has two output shafts rather than one and where the cam follower rollers are in constant engagement with the cam. It is also capable of being directly connected to the motor means. Component parts of mechanism 60 corresponding to similar parts of mechanism 10 will be designated by the same reference number with the suffix A added thereto.

As shown in FIG. 6, mechanism 60 is connected to a motor means 11A by way of a drive shaft 12A which may be a flexible shaft as shown in FIG. 7. As illustrated in FIG. 7, an input shaft 31A is connected to a first output shaft 61 by a pin 62 or other suitable means and to a second output shaft 34A by way of a cam 40A. The first output shaft 61 is connected, through splines 63, to torque tubes 15A and gears (not shown) or other suitable driven means (see FIG. 6) to effect actuation of flaps 16A. The second output shaft 34A is connected to actuate slats 18A through torque tubes 17A and gears (not shown) or other suitable driven means.

The output shaft 61 is drivably connected to drive shaft 12A by way of a compound planetary reduction gear assembly 23A, the output cage or carrier 25A of the assembly being spline connected at 64 to output shaft 61. Since input shaft 31A is connected for conjoined rotation to output shaft 61, rotation of output shaft 61 effects rotation of input shaft 31A.

The rotation of input shaft 31A imposes a torque force on cam 40A through the meshing teeth of threads 33A and 41A on input shaft 31A and cam 40A, respectively. The cam 40A is initially restrained from rotation by a pair of diametrically opposed cam follower rollers 50A (only one of which is shown in FIG. 7) which ride in camming grooves 45A in the outer surface of cam 40. This rotational restraint causes cam 40 to move only axially to the right, as viewed in FIG. 7, which translatory movement continues until the rollers 50A leave the straight portions 45aA and enter the helical portions 45bA of camming grooves 45A. When camming rollers 50A enter helical portions 45bA, a portion of the torque force impressed on cam 40A is permitted to effect rotation of the cam.

The rotation of cam 40A is transmitted to the second output shaft 34A, via the intermeshing splines 37A and 38A which are formed on output shaft 34A and cam 40A, respectively. As shown in FIG. 6, rotation of output shaft 34A causes rotation of torque tubes 17A and gears (not shown) and, in turn, actuation of slats 18A. Since cam 40A is initially restrained against rotation upon rotation of output shaft 61 and input shaft 31A, slats 18A are actuated at a predetermined amount of rotation of input shaft 31A and after actuation of flaps 16A. Upon reverse rotation of drive shaft 12A and, hence, input shaft 31A, flaps 16A and slats 18A are simultaneously moved toward a closed position, the slat 18A reaching a closed position before flaps 16A. The transmission of rotation to the output shaft 34A is terminated when the slat is closed by entry of cam followers 50A into the straight portions 45aA of camming grooves 45A which restrains the cam, as previously described, against rotation.

It is believed now readily apparent that the present invention provides a sequential rotation transmission mechanism of relatively small size and weight but capable of transmitting very high torque loads. It is also a mechanism in which constant and direct mechanical interconnection between the input and output means exists so that sequential operation of elements to be actuated is maintained in all phases of operation and for the operative life of the mechanism.

Although only two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A rotation transmission mechanism comprising:
   a. a housing;
   b. an input shaft supported for rotation in said housing and connected to a source of rotary power to be rotated by the latter;
   c. an output shaft disposed in axial alignment with said input shaft and supported for rotation in said housing;
   d. a cam element coaxially and telescopically arranged relative to said input and output shafts and having a threaded bore;
   e. said input shaft having a threaded peripheral surface portion receivable within and in mesh with said threaded bore of the cam element so as to provide rotative and rectilinear movement of the cam element relative to the input and output shafts and transmission of rotation from the input shaft to the output shaft; and
   f. means supported by said housing to engage said cam element and restrain the latter against rotation so as to cause the cam element to move only rectilinearly and thereby cease transmission of rotation from the input shaft to the output shaft.

2. The mechanism of claim 1 wherein said cam element is substantially cylindrical in shape and has at least one camming groove in the periphery thereof which groove has a portion of helical configuration in registry with at least one straight portion extending parallel to the longitudinal axis of the cam element, and wherein said second means includes at least one cam follower supported by the housing and disposed to ride within said camming groove to prevent rotation of the cam element when in the straight portion of the camming groove and allow rotation of the cam element when in the helical portion of the camming groove.

3. The mechanism of claim 2 wherein said cam follower is a roller means.

4. The mechanism of claim 2 wherein said camming groove has tapered side walls and said cam follower is a roller having a tapered peripheral surface complementary to the tapered side walls of the camming groove.

5. The mechanism of claim 2 wherein said cam element is substantially cylindrical in shape and has two camming grooves beginning diametrically opposite each other in the outer surface thereof, each groove having a helical portion in registry with at least one straight portion extending parallel with the longitudinal axis of the cam element, and wherein said second means includes a pair of juxtaposed cam followers supported by the housing so that a cam follower rides in each of said camming grooves to prevent rotation of the cam when in the straight portions of the grooves and allow rotation of the cam element when in the helical portions of the camming grooves.

6. The mechanism of claim 1 wherein said cam element is substantially cylindrical and has longitudinally extending first splines and at least one camming groove in the outer surface thereof and wherein said second means includes second splines carried by the housing and disposed to mesh with the cam element splines to restrain the cam element against rotation, said second means also includes at least one cam follower supported by the housing to engage the camming groove after a predetermined amount of rectilinear movement of the camming element and before disengagement of the first and second splines.

7. A rotation transmission mechanism comprising:
 a. an elongated housing;
 b. an input shaft supported for rotation in said housing and connected to a source of rotary power to be rotated by the latter;
 c. the input shaft having a threaded surface portion;
 d. a cylindrical cam element having an axial, threaded bore meshing with the threaded surface portion of the input shaft to receive torque from said input shaft so as to be moved rectilinearly and rotatively;
 e. an output shaft supported for rotation in said housing in axial alignment with the input shaft axis and connected to a member to be actuated;
 f. said output shaft being spline connected to said cam element to effect the transmission of rotation from the cam element to the output shaft and also allow axial rectilinear movement of the cam element relative to the output shaft, and
 g. means supported by said housing to engage said cam element and in one operative condition restrain the latter against rotation so as to cause the cam element to move only rectilinearly relative to the input shaft during rotation of the latter and thereby cease transmission of rotation from the cam element to the output shaft and, in another operative condition, allow rotation of the cam element together with rectilinear movement and hence rotation of the output shaft.

8. The mechanism of claim 7 wherein said cam element has at least one camming groove in the peripheral surface thereof, which groove has helical and straight portions, and wherein said means includes at least one cam follower supported by the housing and disposed to ride within said camming groove to prevent rotation of the cam element when in the straight portion and allow rotation of the cam element when in the straight helical portion of the camming groove.

9. The mechanism of claim 7 wherein said cam element has two camming grooves in the peripheral surface thereof each of which grooves consist of helical and straight portions, and wherein said means includes two cam followers supported in juxtaposed positions in said housing so that each cam follower rides within a camming groove, the cam followers and side walls of the camming grooves coacting to prevent rotation of the cam element when in the straight portions of the camming grooves and allow rotation of the cam element when in the helical portion of the camming groove.

10. In combination with a motor means for providing rotary power and a first and a second member to be actuated in sequence, a rotation transmission mechanism comprising:
 a. housing;
 b. an input shaft supported for rotation in said housing and connected to actuate said first member;
 c. said motor means being connected to rotate the input shaft and thereby effect actuation of said first member to be actuated;
 d. an output shaft supported for rotation in said housing in axial alignment with the input shaft and connected to the second member to be actuated;
 e. a cam element mounted within the housing for rotative and rectilinear movement;
 f. the cam element disposed to coaxially surround and connect with the input shaft to receive a torque force from the latter as well as being connected to the output shaft to transmit rotation to the latter upon rotation;
 g. at least one camming groove in said cam element having straight and helical portions;
 h. means including at least one cam follower mounted on said housing to engage said camming groove and, when in the straight portion, prevent rotation of the cam element and effect only rectilinear movement of the cam element and allow rotation when the cam follower enters the helical portion of the camming groove to thereby transmit rotation to the output shaft and actuation of said second member to be actuated after predetermined amount of rectilinear movement of the cam element and after initial actuation of said first member to be actuated.

11. The mechanism of claim 10 wherein said cam element is provided with splines which mesh with splines provided on said housing, the splines coacting to prevent rotation of the cam element and hence translatory movement only under the torque force imposed on the cam element by the input shaft.

12. The mechanism of claim 10 wherein the input shaft has a threaded exterior surface and the cam element has a threaded bore adapted to mesh with the threaded exterior surface of the input shaft to impose a torque force on the cam element upon rotation of the input shaft.

* * * * *